United States Patent
Tallmadge

(10) Patent No.: US 6,924,000 B2
(45) Date of Patent: Aug. 2, 2005

(54) ENVIRONMENTALLY PREFERRED HIGH SOLIDS, LOW VISCOSITY FLOCK ADHESIVES

(75) Inventor: Jack N. Tallmadge, Fairview, PA (US)

(73) Assignee: Lord Corporation, Cary, NC (US)

( * ) Notice: Subject to any disclaimer, the term of this patent is extended or adjusted under 35 U.S.C. 154(b) by 126 days.

(21) Appl. No.: 10/093,258

(22) Filed: Mar. 7, 2002

(65) Prior Publication Data

US 2003/0176567 A1 Sep. 18, 2003

(51) Int. Cl.$^7$ .............................. B05D 1/16; B05D 1/36; C08L 63/00; C08L 75/04
(52) U.S. Cl. ..................... 427/206; 427/200; 156/72; 156/330; 156/331.4; 523/461; 525/452; 525/528
(58) Field of Search ...................... 156/62.2, 72, 330, 156/331.4; 523/456, 461; 525/452, 528; 427/200, 206; 428/90

(56) References Cited

U.S. PATENT DOCUMENTS

| | | | |
|---|---|---|---|
| 2,095,582 A | 10/1937 | Wickman | |
| 3,909,466 A | 9/1975 | Matsui et al. | |
| 4,061,662 A | 12/1977 | Marans et al. | |
| 4,182,825 A | 1/1980 | Jackle | |
| 4,288,577 A | 9/1981 | McShane, Jr. | |
| 4,385,171 A | 5/1983 | Schnabel et al. | |
| 4,535,121 A | 8/1985 | Oezelli et al. | |
| 4,835,226 A | 5/1989 | Warren et al. | |
| 4,888,442 A | 12/1989 | Dunlap et al. | |
| 4,918,119 A | 4/1990 | Seltmann et al. | |
| 5,115,071 A | 5/1992 | Quay et al. | |
| 5,143,995 A | 9/1992 | Meckel et al. | |
| 5,185,402 A | 2/1993 | Fleming et al. | |
| 5,670,599 A | 9/1997 | Bassner | |
| 6,174,984 B1 | 1/2001 | Peter | |
| 6,262,217 B1 | 7/2001 | Tallmadge et al. | |

FOREIGN PATENT DOCUMENTS

GB     1101410     6/1966

*Primary Examiner*—Michael J. Feely
(74) *Attorney, Agent, or Firm*—Miles B. Dearth

(57) ABSTRACT

An environmentally preferred flock adhesive composition containing low molecular weight prepolymers of isocyanate terminated polyether and/or polyalkadiene polyols is disclosed. The prepolymers are free of residual volatile isocyanate (<1000 ppm) without blocking the isocyanate thereby providing favorable effects on viscosity, cure kinetics, and safety. The flock adhesive composition preferably contains an aromatic nitroso compound an epoxy novolak resin and a catalyst. The adhesive compositions can be made at high solids, with minimal co-solvent, while maintaining low viscosity, which is favorable to environmental regulations aimed at reducing solvent emissions. Furthermore, the solvents can be non-HAP and non-photochemically reactive. The adhesive composition can be utilized for the application of flocking fibers to various elastomer substrates.

57 Claims, No Drawings

ENVIRONMENTALLY PREFERRED HIGH SOLIDS, LOW VISCOSITY FLOCK ADHESIVES

BACKGROUND OF THE INVENTION

I. Field of the Invention

The invention is directed to VOC (volatile organic component)-containing flock adhesive compositions based on isocyanate terminated polyols. More particularly, the invention is directed to flock adhesive compositions having reduced amounts of VOC, yet having low viscosity, high percent solids, and long-term adhesion to elastomer substrates over a wide temperature range.

II. Description of the Related Art

The preparation of flocked rubber articles wherein flocks are fixed to the surface of the rubber material through an adhesive layer such as a polyurethane are well known. In such processes, the rubber surface is coated with a layer of the adhesive and short staple fibers are applied perpendicularly thereof utilizing an electrical field. The resulting electrostatically flocked articles are characterized by a fabric-like surface of relatively low friction. This feature renders flocked rubber articles particularly suitable for the purpose of reducing friction between the sliding glass window and window channel of automobiles.

In U.S. Pat. No. 6,262,217, there are taught polyurethane compositions containing a polyurethane prepolymer component of an isocyanate-terminated polyalkadiene having a molecular weight from about 1500 to about 5000 grams per mol (g/mol) and an additional isocyanate-terminated polyalkadiene with a molecular weight from about 500 to about 1500 g/mol.

The curable liquid materials of choice are isocyanate-terminated polyurethane prepolymers. Typical formulations contain 40% by weight polyurethane prepolymer and 60% by weight of a readily volatile (VOC) solvent as a diluent, needed to control viscosity and coatability. Dilution in the solvent gives a sufficiently low application viscosity so that the adhesive can be applied by drip and drag techniques, casting, by roller or by spraying. The most common VOC solvents used include xylene, toluene, ketone mixtures or chlorinated hydrocarbons. In some fiber flock processes much of the solvent is volatilized prior to flocking by high-voltage electrical fields in a flocking cubicle. Ultimately, solvents are emitted in the process and environmental remediation is needed in accordance with environmental standards.

It is known to provide flock adhesive compositions based upon isocyanate prepolymers, in combination with dinitrosobenzene and epoxy-novolaks. Typical examples of such solvent-containing flocking adhesives are disclosed in U.S. Pat. No. 4,535,121. These adhesives contain polyurethane prepolymers based on diisocyanates and polyols, aromatic dinitroso compounds as adhesion promoters, polyfunctional reaction products of isocyanates and epoxide compounds, low-boiling solvents such as toluene or xylene, as well as conventional fillers, pigments and/or stabilizers. The reaction products of isocyanates and epoxide compounds are produced in the absence of water using reaction catalysts which bring about a direct reaction between the epoxide groups and the isocyanate groups. Examples of such catalysts are alkali phenolates, acetates, lactates, naphthenates and alcoholates, and also alkali salts of fatty acids such as lithium stearate. These reaction products contain no epoxide groups.

U.S. Pat. No 4,535,121 discloses an adhesive for flocking elastomers, more especially apolar elastomers, such as EPDM. The adhesive contains an isocyanate-terminated polyurethane prepolymer and, as an adhesion promoter, a reaction product of an aromatic diisocyanate with a polyfunctional epoxide, particularly triglycidyl isocyanurate. The strength of adhesion and resistance of the bonds can be further increased by the addition of aromatic nitroso compounds, for example, 1,4-dinitrosobenzene. The isocyanate terminated urethane prepolymers suggested in U.S. '121 are polypropylene glycols having a molecular weight of from about 500 to about 5000 and, preferably, from about 1000 to about 2000. Other isocyanate-terminated prepolymers suggested are reaction products of castor oil with diphenylmethane diisocyanate or other aromatic diisocyanates. Reaction products of polybutadiene polyols are also suggested. Particularly suitable polybutadiene polyols have molecular weights of from about 500 to about 6000 and more particularly from about 2000 to about 4000 with an OH number of, for example, from about 30 to about 80. Experience has shown that flock adhesives made with isocyanate prepolymers based upon a polyol having an average functionality of 2 for bonding fibers to underlying elastomer substrates do not exhibit acceptable resistance to deformation at high temperatures, such as in a heated molding process used to join two flocked substrates together, e.g., as in a corner.

U.S. Pat. No. 4,835,226 discloses a flock adhesive composition comprising 1 to 20% by weight of an aromatic nitroso compound; about 1 to 20% by weight of an epoxy resin having an epoxy equivalent of at least one; and 60 to 98% by weight of a blocked isocyanate-functional urethane prepolymer. The isocyanate groups of the prepolymer are blocked with a substituted or unsubstituted phenol. The urethane prepolymer has a molecular weight of at least 500, particularly in the range of 1,000 to 10,000, being preferred. In such flock adhesives the residual monomeric isocyanate present will also be converted to the blocked form. Conventional isocyanate prepolymers contain residual monomer—typically in excess of 0.5 wt. % and up to several percent. Due to volatility, monomeric isocyanates are more hazardous than bound or terminal isocyanates and are the major reason why isocyanate prepolymers are blocked. Experience has shown that by blocking free and bound isocyanates on prepolymers and in particular, blocking the isocyanates on the prepolymer backbone, leads to slower cure kinetics and a viscosity increase. The viscosity increase must be compensated with higher solvent diluent levels to render these adhesive fluids adaptable for coating elastomer substrates. It would be desirable to minimize viscosity, reduce VOC content and provide flock adhesives that are essentially free of volatile monomeric isocyanates (<0.1% free isocyanate).

U.S. Pat. No. 4,918,119 discloses a moisture-hardening flocking adhesive for elastomer flocking containing a $C_8$–$C_{16}$ substituted diluent which is not a volatile organic component and is not driven off prior to electrostatic application of flock fibers. The adhesive contains an isocyanate terminated polyurethane prepolymer, an aromatic dinitroso compound and an essentially hydroxyl-free epoxy resin having an epoxide value of from about 0.45 to about 0.75. The composition is essentially free of highly volatile organic solvents. The composition is characterized as having improved storage stability and provides excellent adhesion between elastomeric substrates and flocking fibers, even after exposure to water. The essential adhesive component as claimed by '119 comprises:

(a) an isocyanate terminated polyurethane prepolymer based upon a mixture of difunctional polyols, one having a number average molecular weight of from about 400 up to 1000, and another having a number average molecular weight of from more than 1000 up to about 4000;
(b) aromatic dinitroso compound;
(c) epoxy resin having an epoxide value of from about 0.45 to about 0.75 and a hydroxide value of less than about 0.01; and
(d) at least one $C_8$–$C_{16}$-alkyl substituted benzene.

In the majority of flock applications where VOC compounds are preferred for rapidly drying of the adhesive coating prior to flocking, a diluent of low volatility cannot be used. In these instances where a VOC is preferred, it would be desirable to reduce the level of VOC emitted from the flocking process. Reducing the level of organic diluent, whether a VOC or less volatile organic solvent, is problematic owing to the effect of the organic diluent on adhesive viscosity. Useful adhesive for coating elastomer substrates must wet the elastomer evenly and not recede or form pools. It would be desirable to provide a solvent-based flocking adhesive which contains reduced VOC and yet provides good wetting and even distribution on elastomeric articles. An adhesive having a Brookfield viscosity at room temperature (~25–30° C.) of 100 to 1500 centipoise (LV@2/30 rpm) and containing reduced solvent levels would be desirable.

Regulations aimed at reducing solvent emissions and usage of HAP (hazardous air pollutant) or photochemically reactive solvents vary with country, state, and county. Plant location (local regulations), usage, and other factors control what level and type of solvents are tolerable. This invention aims at eliminating HAP and photochemically reactive solvents and further aims at reducing the levels of environmentally preferred solvents. Any improvement in OC levels is desired, <4 pounds/gallon (lbs/gal) but reducing solvent directly compromises viscosity. The present invention enables reduction in solids while maintaining desirable working viscosity at room temperature. Preferred examples show adhesives that target an OC level of 2.5 lbs/gal which is a significant improvement in adhesive VOC's (~71.5% solids). Such adhesives can be prepared with viscosities in the 125–300 centipoise (cps) range which is preferred (broad window 50–1500 cps). Yet further reduction in solvent is possible, 85–90% solids or beyond—the compromise being to viscosity. Conventional flock adhesives are found typically at less than even 50% solids (4 lbs/gal OC), viscosity at 150–300 (cps), and are in HAP solvents.

U.S. Pat. No. 5,185,402 discloses a flock adhesive based on a combination of two distinct polyurethane prepolymers and a film-forming component. A first polyurethane prepolymer is derived from poly(alkylene oxide) polyols and a second polyurethane prepolymer derived from poly(alkylene oxide) polyols and at least one dimer acid polyol. The preferred polyols suggested for preparation of the prepolymer are a combination of polyols which differ in molecular weight. Specifically, the '402 patent teaches a preferred combination of a poly(alkylene oxide) polyol having a molecular weight in the range of from about 600 to 1,400, preferably about 800 to 1,200, with a second poly(alkylene oxide) polyol having a molecular weight in the range of from about 1,600 to 2,400, preferably about 1,800 to 2,200. However, '402 does not teach the effect of the isocyanate terminated prepolymer upon viscosity in a solvent-containing adhesive.

Experience has shown that prepolymer and level of organic diluent in flock adhesives containing isocyanate-terminated prepolymers significantly affects viscosity and the degree of coatability. Owing to increasing environmental limits being imposed by processors of volatile organic components levels, the amount of solvent should be minimized, however with some prepolymers, the level of solvent necessary to provide a low viscosity for coatability remains a challenge. Improved low viscosity, low VOC, flock adhesives based upon isocyanate terminated polyols which exhibit good fiber and substrate adhesion strength over a wide service temperature range would be highly desirable.

Of primary concern for solvents used in the flock adhesive art, the aromatic solvents often employed in conventional flock adhesive products are cited in the 1990 Clean Air Act as hazardous air pollutants (HAPs), and are targeted for elimination under the National Emission Standards for Hazardous Air Pollutants. Aromatics also have low permissible exposure limits (PELs) and contribute to workplace health hazards. Finally, aromatic solvents have an extremely low level of biodegradability. This causes concern from a waste treatment standpoint or if the product were to migrate into natural waterways. A flock adhesive absent HAP, or a minimized level of HAP would be desirable.

SUMMARY OF THE INVENTION

There has now been found a flock adhesive composition that is HAP free and in general, having low levels of VOC at a limited weight percent amount yet desirably exhibits a low viscosity and good coatability on elastomer substrates. These adhesive are capable of attaining very high percent solids content and retain coatability. The flock adhesive also is characterized by being essentially free of residual, hazardous diisocyanate monomers (volatile isocyanates) in the blocked or unblocked versions. The flock adhesive containing an un-blocked diisocyanate is preferred and provides low viscosity compared with equivalent blocked-isocyanates and faster curing kinetics. The flock adhesive composition generally comprises the reaction product of low molecular weight polyols and volatile diisocyanates. The low molecular weight diisocyanate terminated prepolymers are based on polyol(s) having an overall average functionality of from 2 to 6, preferably from, 2.2–6. Typically, prepolymer functionality is not uniform but is comprised of a mixture of varying functionality. Higher functionality materials (3–5) are preferred as they provide branching that improves film integrity, particularly at elevated temperatures. The adhesives optionally, and preferredly, contain a nitroso compound and other optional components, such as catalyst and resins. The flock adhesive exhibits excellent adhesion to cured or uncured elastomer substrates and retains flock fibers under long-term weathering conditions. Preferred embodiments exhibit, in addition, excellent resistance to distortion of the flocked elastomer in subsequent hot molding steps encountered in some adaptations to automotive door and window trim channels.

DISCUSSION OF THE PREFERRED EMBODIMENTS

The flock adhesive compositions of the present invention are based upon polyurethane prepolymers formed from the reaction of polyfunctional polyols typically with excess polyisocyanate monomers such that capping is predominant and chain extension is minimized. Residual volatile isocyanates are then reduced, leaving prepolymers that contain very low levels of hazardous volatile isocyanate monomers. Prepolymers can and often are blended in adhesive formulations to balance characteristic properties such as tensile strength, heat strength, wetting, solubility, and cost. Polyetherpolyol prepolymers are derived from one or more alkylene oxide repeat units containing from 2 to about 10 carbon atoms. Linear and branched structures varying in functionality are known. Polyalkadiene polyols are made from 1 or more conjugated diene monomers having from 4 to 10 carbon atoms in each repeating unit, such as butadiene, isoprene, and the like. Such prepolymers are characterized as having a molecular weight in the range of 650 to 3500, and an amount of monomeric polyisocyanate less than 1000 ppm. Polyalkadiene polyols are commercially available under the tradenames Epol®, R45HT, manufactured by Idemitsu Sekiyu Chemicals, Polytel manufactured by Mitsubishi Kasei Industries, and the like. The hydroxy-terminated polyalkadienes can be non-hydrogenated (i.e., have a hydrogen saturation degree of carbon to carbon double bonds in the hydroxy-terminated polyalkadiene of less than about 50%). Saturated polyalkadienes having a hydrogen saturation degree of at least about 80%, and higher, and mixtures of saturated and unsaturated compounds can also be used.

Suitable multifunctional polyether polyols as reactants to be capped with a diisocyanate have an average OH functionality of at least 2 and preferably from 2.2 to 6, are commercially available and include reaction products of alkylene oxides, for example, ethylene oxide and/or propylene oxide. Preferably a tri-or tetraol is reacted with a glycol which results in a polyetherpolyol having an average OH functionality in the range of 2.2–6. In the preparation of the prepolymer, chain extension is minimized typically by employing a polyisocyanate or diisocyanate monomer, on an equivalents basis, in an excess of 4:1 per equivalent weight of polyol. The polyol equivalent weight is in a range of from 200 to 1000. Exemplary polyols are di- or multi-functional polybutadiene polyol, polyester polyol, and alkylene ether polyols. The preferred polyol is based on PTMEG and/or PPG. Alkylene ether polyols having a functionality greater than 2 include polyols based upon TMP, glycerol, pentaerythritol, dipentaerythritol, and sucrose, and the like. Commercial suppliers of alkylene ether polyols include MOBAY, DOW and BASF. The most preferred alkylene ether polyol is a polyether polyol based on polypropylene glycol and pentaerythritol.

Polyol synthesis is conducted with initiators containing from 2 to 8 active hydrogen atoms per molecule. Suitable initiators include glycerol, trimethylolpropane, triethanolamine, pentaerythritol, sorbitol and sucrose; polyamines, including ethylene diamine, tolyene diamine, diaminodiphenylmethane and polymethylene polyphenylene polyamines; and aminoalcohols, including ethanolamine and diethanolamine; and mixtures thereof. The polyethers having an OH functionality of generally greater than 2.2 and higher can be used individually or in a mixture of polyols, the mixture resulting in a polyether having an average OH functionality of at least 2.2 and more preferably from 3–5, as starting materials for an isocyanate-terminated prepolymer. With regard to polyols useful for adaptation according to the teachings of the present invention, suitable methods are taught in U.S. Pat. No. 5,185,402, which is incorporated herein by reference.

The method to make the prepolymers used herein is essential to obtain control of viscosities for limited levels of VOC in the flock adhesive, within the limits specified herein. These methods are disclosed in U.S. Pat. Nos. 5,115,071, 5,670,599 and 6,174,984 each of which is incorporated herein by reference. The most preferred prepolymer is based on a TDI capped polypropylene glycol and the TDI capped copolyether of pentaerythritol and PPG, as described by CAS# 51617-66-4 XU. The preferred prepolymers are NCO capped in the presence of an excess (4:1 or higher equivalents basis) charge ratio of diisocyanate, and after conversion monomeric isocyanate typically is reduced to a level of residual free isocyanate less than 1000 ppm. It is critical that the residual isocyanate level remains low (<1000 ppm) for reducing exposure risk and toxicity from residual volatile isocyanate monomer. This attribute reduces toxicity without the need for "blocking" in accordance with the teaching hereinabove to provide a low viscosity, low VOC, elastomer-coatable flock adhesive. The reduced residue of NCO monomer enables lowering of the amount of VOC generally to not more than 50% by weight, and preferably to lower levels specified herein. Prepolymers having minimized chain extension are essential. Preferred prepolymers that have an 80% or higher proportion of a 1:1 adduct of diisocyanate:OH and a proportion of less than about 15% of chain extended prepolymer (having NCO linkage to more than one polyol) is critical to avoid unacceptable viscosity in the adhesive subject to a limit on the amount of VOC.

The NCO sites on the prepolymer may optionally be blocked by employing conventional techniques using a conventional blocking agent such as an unsubstituted or substituted phenol, for example, phenol and alkyl-substituted C phenols, such as phenols substituted with alkyl groups of 1 to 10 carbon atoms or more. MEK oxime is another conventional blocking agent. Preferred prepolymers are unblocked, as blocking the prepolymers has undesirable curing kinetic effects and also increases viscosity.

The flock adhesive generally comprises on a dry weight % basis:

2.5%–50%, preferably 2.5% to 30%, more preferably 15%–30% of a HAP and/or non-HAP organic solvent;

55%–97% of isocyanate prepolymer defined herein,

0%–15%, preferably 0.5%–15%, more preferably 2%–8% of a nitroso compound,

0%–20%, preferably 3%–6% of an epoxy novolak,

0%–2%, preferably 0.1–1% of a catalyst for curing the prepolymer,

0%–1%, preferably 0.3% fluorescing agent, and

0%–4%, preferably 1–2% of a silicate rheology modifier.

The aforementioned isocyanate-terminated prepolymers based on the reaction product of an excess of polyisocyanate or diisocyanate monomer ("isocyanate") and particular polyols meeting the functionality limits specified, and within the specified limits of residual free isocyanate monomer are made using conventional techniques. The prepolymers are prepared by capping hydroxy-terminated polyether polyol or polyalkadiene polyols having an average functionality of from 2 to 6, with isocyanate functional groups using suitable isocyanate compounds known in the art, including aliphatic, cycloaliphatic, aromatic and alkyl-substituted aromatic diisocyanates and polyisocyanates. Diisocyanates that are suitable for making the prepolymers used herein include para-phenylene diisocyanate (PPDI), tolidene diisocyanate (TODI), isophorone diisocyanate (IPDI), 4,4'-methylene bis (phenylisocyanate) (MDI), toluene-2,4-diisocyanate (2,4-TDI), toluene-2,6-diisocyanate (2,6-TDI), naphthalene-1,5-diisocyanate (NDI), diphenyl-4,4'-diisocyanate, dibenzyl-4,4'-diisocyanate, stilbene-4,4'-diisocyanate, benzophenone-4,4'diisocyanate, 1,3- and 1,4-xylene diisocyanate, 1,6-hexamethylene diisocyanate, 1,3-cyclohexyl diisocyanate, 1,4-cyclohexyl diisocyanate (CHDI), the three geometric isomers of 1,1'-methylene-bis(4-isocyanatocyclohexane) (abbreviated collectively as $H_{12}$ MDI), and mixtures thereof.

While a variety of isocyanates may be used to form the prepolymer, TDI is preferred because of its low cost, and ease of removal of free TDI monomer. TDI can be a mixture of the two main isomers of toluene diisocyanate, that is, the 2,4- and the 2,6-diisocyanate and optionally, a small amount of the ortho isomers, the 2,3- and 3,4-isomers. Commercially, toluene diisocyanate is found as a 65:35, 80:20 or 99:1 isomer mix of the 2,4- and 2,6-isomers by weight and, optionally, from 0–5% by weight of the ortho isomers.

Removal of residual isocyanate is a critical aspect of the isocyanate terminated prepolymers used in the invention due to the excess diisocyanate used to minimize chain extension in the reaction with a polyol. The prepolymers are processed to reduce the residual isocyanate monomer to less than 1000 ppm, preferably less than 200 ppm, based on the prepolymer. A variety of isocyanate removal techniques are known in the art for reducing the amount of MDI or TDI monomer in the prepolymer prior to incorporation into the adhesives of the present invention. British Patent 1,101,410 and U.S. Pat. No. 4,182,825 describe a process for distilling the prepolymer reaction product under vacuum conditions to reduce the amount of diisocyanate. U.S. Pat. No. 4,385,171 describes a method for the removal of unreacted diisocyanate from polyurethane prepolymers by codistilling the prepolymer reaction product with a compound that boils at a temperature greater than the boiling point of the diisocyanate. U.S. Pat. No. 4,061,662 describes a process for the removal of unreacted toluene diisocyanate from prepolymers by passing the prepolymer reaction product through a column containing a molecular sieve. Thin film evaporative methods are also known and useful. U.S. Pat. No. 4,888,442 describes a two-step process consisting of a first step of distilling the prepolymer reaction product to remove the bulk of the diisocyanate and then, in the second step, adding a solvent to the distilled prepolymer reaction product and passing the resultant mixture through an agitated thin-film evaporator. According to this patent, the vaporization temperature of the solvent should be exceeded under the conditions employed in the thin layer evaporator. U.S. Pat. No. 4,288,577 describes the removal of unreacted methylene bis(4-phenyl isocyanate) (MDI) via solvent extraction with hexane.

In order to improve adhesion, an aromatic nitroso compound is optionally, and preferredly utilized. The nitroso compound crosslinker can be any aromatic hydrocarbon, such as benzenes, naphthalenes, anthracenes, biphenyls, and the like, containing at least two nitroso groups attached directly to non-adjacent ring carbon atoms. More particularly, such nitroso compounds are described as poly-C-nitroso aromatic compounds having from 1 to 3 aromatic nuclei, including fused aromatic nuclei, having from 2 to 5 nitroso groups attached directly to non-adjacent nuclear carbon atoms. The presently preferred poly-C-nitroso materials are the di-nitroso aromatic compounds, especially the dinitrosobenzenes and dinitrosonaphthalenes, such as the meta- or paradinitrosonaphthalenes. The nuclear hydrogen atoms of the aromatic nucleus can be replaced by $C_1$–$C_{10}$-alkyl, $C_1$–$C_{10}$-alkoxy, $C_4$–$C_8$-cycloalkyl, aryl, aryl-substituted alkyl, ($C_1$–$C_8$) alkyl-substituted aryl, arylamine, aryinitroso, amino, halogen, and the like groups. The presence of such substituents on the aromatic nucleus has little effect on the activity of the poly-C-nitroso compounds in the present invention. Particularly preferred nitroso compounds are characterized by the formula: $(R)_m$—Ar—$(NO)_2$ wherein Ar is selected from the group consisting of phenylene and naphthalene; R is a monovalent organic radical selected from the group consisting of alkyl, cycloalkyl, aryl, aryl substituted alkyl, alkyl substituted aryl, arylamine, and alkoxy radicals having from 1 to 20 carbon atoms; amino, or halogen, and is preferably an alkyl group having from 1 to 8 carbon atoms; and m is zero, 1, 2, 3, or 4, and preferably is zero.

A wide variety of poly-C-nitroso aromatic compounds are operable in the present invention, including those listed in U.S. Pat. No. 2,905,582, which is hereby incorporated by reference. A partial non-limiting listing of suitable poly-C-nitroso compounds which are suitable for use in the practice of the invention include m-dinitrosobenzene, p-dinitrosobenzene, m-dinitrosonaphthalene, p-dinitrosonaphthalene, 2,5-dinitroso-p-cymene, 2-methylene-1,4-dinitrosobenzene, 2-methyl-5-chloro-1,4-dinitrosbenzene, 2,fluoro-1,4-dinitrosobenzene, 2-methoxy-1-3-dinitrosobenzene, 5-chloro-1,3-dinitrosobenzene, 2-benzyl-1,4-dinitrosobenzene, and 2-cyclohexyl-1,4-dinitrosobenzene, with 1,4-dinitrosobenzene and the poly-C-nitroso compounds being preferred. Nitroso compounds are preferred for flock adhesives which are processed using a rapid, high temperature cure cycle. When employed, dinitrosobenzene will normally be present in an amount ranging from about 0.5% to about 15% dry weight basis, and preferably from about 2% to about 8% dry weight basis of the flock adhesive, introduced as a 35% solution in HALSO 99.

Optionally, the flock adhesive composition of the present invention may contain epoxy resins, such as epoxy-novolaks. Epoxy novolaks can be classified as hydroxy-functional, and non-hydroxy functional types and are known in the art. They are formed by reacting an epoxy-containing compound with a novolak. The reaction products of isocyanates and epoxide compounds are produced in the absence of water using reaction catalysts which bring about a direct reaction between the epoxide groups and the isocyanate groups. The polyfunctional, hydroxyl-free epoxy novolak resins are preferred for use and have hydroxyl values of less than 0.5. Specific examples of epoxy resins, and epoxy-novolaks include the reaction products of epichlorohydrin with novolaks or bisphenols and are available under the tradenames Heloxy® 48 (triglycidylether of trimethylolpropane, with an epoxy equivalent weight of about 140–160) (Shell Chemical); Epon® 828 (a diglycidyl ether of bisphenol A having epoxy equivalent weight of 185–192); and Epon® 862 (diglycidyl ether of Bisphenol F) from Dow Chemical Company.

Hydroxy functional epoxy-novolaks optionally employed in the flock adhesive according to the invention contain free hydroxyl groups and include polyglycidyl ether of an aliphatic polyhydric alcohol or adducts or polybasic acid thereof, chain extended with ethoxy-, propoxy-, isopropoxy-, oxytetramethylene-, saturated or unsaturated alkyl-, alicyclic-, polyether- and polyester-linkages, or combinations thereof. Specific examples include diglycidyl ethers of epichlorohydrin and bisphenol A or F. Particularly useful epoxy novolaks are TMP triglycidyl ether, bisphenol F and diglycidyl methacrylate The hydroxyl-functional novolak can be made from a variety of phenolic compounds such as phenol, cresol, and other substituted phenols. It has been found that the epoxy novolaks having less than 3, preferably less than 2.5, epoxy groups per molecule are particularly effective. The epoxy novolak, when utilized in conjunction with a catalyst or absent a catalyst, will be present in an amount from 0% to about 20% dry weight basis, and preferably from about 3% to about 6% dry weight basis of the flock adhesive. Examples of catalysts which will cure the epoxy novolak with the isocyanate prepolymer are alkali phenolates, acetates, lactates, naphthenates and alcoholates and also alkali salts of fatty acids such as lithium stearate. Hydroxyl-functional epoxies are not preferred for 1-pack (1-part) flock adhesives because they compromise shelf stability and result in undesirable increased viscosity.

Of critical importance in achieving flock adhesives having more environmentally friendly constituent levels, the VOC component(s) used herein are organic solvents that dissolve the prepolymer. A mixture of HAP and non-HAP solvents may be used. Solvents are selected as needed for providing adhesive solubility, compatibility with the elastomer substrate, low cost, runnability, drying rate and development of adhesive strength.

Non-HAP solvents are preferred and include methyl acetate, n-butyl acetate, t-butyl acetate, acetone, ethyl acetate, isopropyl acetate, isobutyl acetate, n-butyl propionate, tetrahydrofuran, n-methyl pyrrolidone, aliphatic hydrocarbons such as heptane, dimethylformamide, diisobutyl ketone, methyl isoamyl ketone, monochlorotoluene, and vm&p naphtha. N-butyl acetate is the preferred non-HAP solvent.

Among the HAP solvents which are photochemically reactive in the atmosphere are hexane, xylene, toluene, MEK, and MIBK. Toluene, xylene, MEK and MIBK are the preferred solvents when HAP usage is not important. However, in a preferred embodiment, the adhesive is non-HAP and non-photochemically reactive and will contain less than 20 wt. % of an isomeric blend of chlorotoluenes and n-butyl acetate. More typically, less than 10% of chlorotoluene is present with less than 25% n-butyl acetate.

In one embodiment, the amount of solvent is limited according to the present invention to from about 2.5% to about 50%, preferably from about 2.5% to about 30%, and desirably from about 15% to about 30% of a HAP and/or or non-HAP organic solvent, of the total weight of the flock adhesive. In terms of pounds of solvent per gallon of adhesive (lbs/gal), the preferred embodiment contains less than 4 lbs/gal, preferably less than 3 lbs/gal, and more preferably 2.5 lbs/gal or less of a HAP, non-HAP or mixture of HAP and non-HAP solvents. A VOC content of approximately 4 lbs/gal. corresponds to a 50 wt. %. solids level. A VOC content of approximately 2.5 lbs/gal corresponds to 71.5 wt % solids (29.5 wt. % solvent). An 82 wt. % solids level corresponds to a VOC content of 1.65 lbs/gal., while still having a viscosity <1000 cps. In a preferred embodiment, from about 2.5 to about 30% of a non-HAP solvent is present Adhesive formulations containing up to 90% total solids can be processed at ambient temperatures, and the above viscosities refer to viscosity measurements made at ~23° C. (room temperature) using a Brookfield viscometer, spindle 2 at 30 rpm. Adhesives having a total solids content from about 90% to 97.5% generally exhibit viscosities above 1500 cps. However these are easily processed at elevated temperatures of from 30° C. to 100° C. where the viscosity at the running temperature is within 50–1500 cps, measured at a preselected elevated temperature from 30° to 100° C.

Optionally but preferredly a catalyst which aids in curing the isocyanate prepolymer is used according to this invention by a reaction of the NCO with active hydrogen, including but not limited to, for example, an organometallic compound of tetravalent tin such as, tin dioctoate, tin diethylhexanoate, dibutyl tin dilaurate, and dibutyl tin diacetate. Preferred urethane-forming catalysts include dibutyl tin diacetate and dibutyl tin dilaurate in an amount up to about 2% by dry weight basis of catalyst, and preferably in an amount from about 0.1 to about 1.0% by dry weight basis of catalyst. The use of catalyst is dependent upon the desired cure profile. Typically, where production speed or limited space is used, catalysts can provide more rapid curing time.

Additionally, the flocking adhesive composition of the invention can include other conventional materials such as filler materials, including carbon black and the like, pigments, wetting aids, rheology modifiers and indicators. Drying agents of the conventional type used for epoxy adhesives, or one-pack urethane adhesives can be advantageously used to ensure good in-can shelf-life. Other additives include, for example, fatty acids, oxides of magnesium, calcium or zinc, vulcanization accelerators, stabilizers, solvents, fillers and the like.

Incorporation of indicators into flock adhesives is desirable during adhesive application. Particularly useful are UV fluorescing agents which are activated by common shop lighting. Such indicators glow or in some way enhance contrast of the adhesive to the substrate making it easier to visually verify the presence of, and sometimes improve visual assessment of the quantity of adhesive applied. When the optional indicator is present, the adhesive composition will generally contain up to 1% and from 0.3% of the indicator on a dry weight basis.

The flocking adhesive composition according to the invention may be used as a one-pack or as a two-pack adhesive. One-pack compositions cure by moisture diffusing into the adhesive composition from the surrounding atmosphere or from fibers with which the composition comes in contact. Reactive NCO groups present react with water to form amines which, through the $NH_2$ groups, react partly with the residual isocyanate groups to form polyureas and partly with the free epoxy compounds if present. Other active hydrogen containing materials also may be involved. Heat activated urethane side reactions also may occur. Adhesion and stability to weather influences, particularly water, can be distinctly improved through this hardening mechanism.

In a 2-pack system, the A-side contains the isocyanate prepolymer and other components. The B-side contains supplemental polyfunctional active hydrogen-bearing compounds such as the aforementioned polyols used to form the isocyanate-terminated prepolymers. Preferred polyols useful in part B are generally referred to as short-chain polyols with equivalent weights in the range 200–600. The amount of solvent in Part B and the distribution of non-isocyanate A-side components can vary. Catalyst is optional, but is not typically used in these 2-pack systems. Without catalyst, the preferred embodiments containing TDI-functional prepolymers can achieve pot-life up to several hours with primary hydroxyl functionality.

In the coating of flock adhesive on cured elastomers, the flock adhesive of the invention is applied or coated onto rubber in a conventional manner such as by dip and drag, spraying, brushing and the like. After the coating, the fibers are applied in electrostatic field and the adhesive subsequently hardened for about 1 to about 4 minutes at temperatures in the range of from about 300° F. to about 500° F. The flocking fibers are in the form of short, uniform lengths and applied to an adhesive-coated elastomer substrate. The flock fibers applied using the adhesives of the invention include various synthetic fibers, for example, can be polyester fibers such as polyethylene terephthalate polyamide, fibers such as Nylon-6 or Nylon-6,6, polyurethane fibers, cotton fibers and/or cellulose fibers, all well known to the art and to the literature.

The flocked article is further allowed to stand in order to cure the adhesive. In some instances adhesive curing can occur over hours or days at relatively warm temperatures, including ambient conditions. Typically the adhesive is cured more rapidly for example, for about 2 to about 5 minutes at temperatures in the range of about 300° F. to about 500° F. A typical curing profile in the U.S. for flocked EPDM articles is at 350–500° F. for 1.5 to 3 minutes, and in some cases up to 5 minutes.

Various elastomer substrates can be flocked before or after vulcanization using the adhesives of the invention. Illustrative of elastomeric shaped materials that can be flocked are natural rubbers, polychloroprene rubber, nitrile rubber, TPE, TPO, chlorobutadiene, chlorinated isoprenes, butyl rubber, polyurethane rubber or elastomers based on butadiene or styrene-isoprene. In most instances, however, the adhesives will be used to flock elastomers based on ethylene/propylene copolymers (EPM) and preferably terpolymers of ethylene, propylene and diene monomers such as, for example, diethylidene norbornene. Elastomers of this type are commercially available and are known collectively as EPDM elastomers. Profiles made from such materials may be used in applications such as sealing strips in window channels of automobiles. Other applications include flocked mats, flocked flexible shafts, flocked floor coverings, flocked rubber gloves, sticker boards for demonstration purposes, flocked clearer rollers for the spinning machine industry, textile tubes, and storage compartment innerlinings, e.g., glove box innerlinings, and the like. Chlorinated polyolefins, e.g. chlorinated poypropylene-based primers are typically employed to obtain adhesion to low energy TPE type substrates.

Other utilities for the adhesive compositions of the present invention, broadly stated include adhesive used to join elastomer or primed elastomer to any other substrate containing active hydrogen or known to be bonded by isocyanate functional polymers.

The following examples show ways in which the invention can be practiced and evaluated. However, the examples should not be construed as limiting the invention.

Hot Melt Test

The procedure referred to herein as the hot melt test measures flock adhesion to the elastomer substrate. The test utilizes a hot melt applied to the flocked fibers on a cured specimen of a specified bonding width. The cohesive strength of the hot melt under the test conditions is chosen so as to be higher than the flocked fiber adhesive strength, and adhesive strength to the elastomer so that the force to pull the fibers or the adhesive away from the elastomer substrate can be measured. The hot melt is cast in a retaining channel from an aluminum fixture.

Flocked elastomer strips are prepared and cured. Loose flock and debris are brushed thoroughly and the flock surface is blown with compressed air to thoroughly clean the remaining loose flock fibers. A 1.5" wide×8" long×0.25" thick rectangular aluminum block has a centrally located rectangular dimensioned aperture with a thin retaining lip surrounding the opening of the aperture on the face contacting the flocked specimen. The aperture opening at the lip measured a width of 0.25 inch and is approximately 2" in length. The inner dimension at the retaining lip is less than the fill-side dimension so as to retain the cast hot melt against the aluminum fixture and expose the hot melt in the aperture to the surface of the flocked specimen.

The flocked part is placed onto a work surface with flocked side facing upward, and a portion of the elastomer substrate is allowed to extend beyond the fixture for later gripping in a tensile tester. The aluminum fixture is placed over the flocked part such that the fill side (back side) is oriented upward, and the aperture with retaining lip is oriented to the flocked specimen underneath.

Hot melt adhesive is extruded at a quick rate to fill the opening. The hot melt bonds to the fibers under its own weight without penetrating to the underlying elastomer. 3M® hot melt 3764 was used. (6000 cps @ 375° F.). After cooling, excess hot melt is trimmed from the back surface of the fixture with a razor to enable mounting of the fixture to the floating table on the tensile tester. The cooled hot melt has a sufficient stiffness and is retained within the aperture by the retaining lip, so that the elastomer specimen can be pulled away from the hot melt. After the tensile testing, the hot melt can be forced back through the fill side of the opening away from the retaining lip for re-use of the fixture. The treated sample is allowed to stand at least 1 hour before peel testing. A tensile tester is set to peel the elastomer at a rate of 2 inches/minute and at an angle of 90°. The floating table is affixed to the stationary fixture of the tensile tester. This maintains the peel angle at 90°. The aluminum fixture and bonded specimen are mounted in the tensile tester such that the fixture is fastened to the lower floating table and the elastomer tail is gripped. The protruding elastomer section is gripped and pulled and the peak load is measured (×4=p.l.i. for a 0.25 in. width band). This Hot Melt Procedure is also disclosed in Chrysler procedure LP-463-AB-5-12.

The failure mode is noted. Failure can occur in the rubber, between the rubber and adhesive, within the adhesive, between the adhesive and flock, or between the flock and hot melt. The failure mode is often a combination of two or more of these modes. The hot melt and rubber sides of the failure are evaluated to assess the failure mode. The specimen scope is used whenever possible. The following designations are used:

| Mode | Hot Melt Side | Rubber Side |
| --- | --- | --- |
| RC (rubber to cement) | Cement @ tip of flock | Bare rubber |
| Coh (cohesive in cement) | Cement @ tip of flock | Cement on rubber, may be a little flock |
| CF (cement to fiber) | Lots of flock, no cement | Cement, flock too poor density |
| HM-F (hot melt to flock) | No cement, little flock | Good flock density |
| R (cohesive in the rubber) | Rubber | Rubber |

Heat/Mold Resistance: A test was conducted to simulate joining two flocked sections in an injection molding cycle. Flocked parts were compressed between 2 heated platens of a 1 foot square press at a pressure of 400 or 800 pounds per square inch (psi). The degree to which the flocking is distorted was estimated visually using a scale of 0–5, where 0 is no distortion, and 5 is worse case where the flock+glue are removed by the process. The area of the flocked part of roughly 3 square inches corresponded to 19,200 and 38,000 psi on the flocked part. Temperatures used were 350° F. and 400° F.

EXAMPLES

All examples listed evaluated flock adhesives that were brush-applied onto the elastomer substrate at room temperature to a target dry film thickness of 3 mils. Adhesive coated substrates were flocked [Cellusuade polyester @ 3 denier and 0.75 mm length] in an electrostatic lab unit flocker immediately (<30") after adhesive application. Profiles were cured at given cure cycles then allowed to stand at least overnight before testing. EPDM elastomers used were commercial grades. EPDM elastomers were toluene wiped, sand paper abraded, then toluene wiped again to provide a clean elastomer surface.

Example 1

| Component | |
|---|---|
| 4.8 | EPON® 862* |
| 2.9 | dinitrosobenzene |
| 1.2 | moisture scavenger |
| 1.9 | wetting agent |
| 0.3 | fluorescing agent |
| 1.0 | fumed silica thixotrope |
| 0.5 | tin catalyst |
| 87.4 | Airthane PCG 475A** |
| 100% | (dry wt. basis) |

*bisphenol F/epichlorohydrin epoxy (Shell).
**polyether (PPO) TDI prepolymer @ ~8% NCO, <0.1% (<1000 ppm) free TDI (Air Products and Chemicals).

The total solvent content was ~28.5% by wt. and was comprised of n-butyl acetate and chlorotoluene. Total VOC was less than 2.6 lb./gal. Residual moisture scavenger was always <1000 ppm.

Adhesive formulation procedure: All components minus the prepolymer (Airthane PCG 475A) were added to a jar/container and ground using ⅛" ceramic grind media and a paint shaker for 30 minutes. Prepolymer was added after grinding and this mixture was rolled for one hour. The ceramic media was strained out when completed.
Viscosity @ RT was 190 cps.
The substrate was EPDM. Cure was 3'@ 425° F.
Hot Melt performance: 25 pli, 93% R, 7% CF
Heat/molding resistance: Example 1 was rated a "1" with minimal distortion at all combinations.

Example 2

| | |
|---|---|
| 100 | Airthane PHP-75D* |
| 0.5 | tin catalyst |
| 18 | xylene |
| 118.5 | total wt. parts |

*PTMEG-TDI prepolymer with 9.1% NCO, <0.1% free TDI (Air Products)

Procedure: Ingredients were rolled in w/o grinding.
This adhesive exhibited ~800 cps viscosity (Brookfield, LV-II, 30 rpm, #2) at a total solids level (t.s.c.) of ~85% by wt.
The substrate was EPDM. Cure was 3'@475° F.
Hot Melt Performance: 18 pli (4.4#) 30HMF.RC

Example 3

| Dry Wt. | Ingredient |
|---|---|
| 78.5 | Airthane PHP-75D |
| 10 | EPON 862 |
| 10 | dinitrosobenzene |
| 0.5 | tin catalyst |
| 0.9 | moisture scavenger |
| 1.0 | wetting agent |
| 100.9 | total wt. parts |

Final adhesive contained ~75.2% solids in a solvent blend—mostly n-butyl acetate and a lesser fraction of chlorotoluene. (non-HAP, non-photochemically reactive) ~2.1 #/gal OC, ~440 cps (Brookfield LV-II, 30 rpm, #2, ~23° C.).
Adhesive formulation—see procedure for Example 1.
The substrate was EPDM. Cure was 3'@475° F.
Hot Melt performance: 45–60 pli with 100% R.

Example 4

| Dry Wt. | Ingredient |
|---|---|
| 89.0 | Airthane PHP-75D |
| 1.9 | EPON 862 |
| 4.1 | dinitrosobenzene |
| 0.5 | tin catalyst |
| 2.5 | moisture scavenger |
| 1.3 | black pigment |
| 1.1 | fumed silica thixotrope |
| 100.4 | total wt. parts |

Final adhesive was ~75% solids in a solvent blend—mostly n-butyl acetate and a lesser fraction of chlorotoluene. ~2.1 #/gal OC.
Adhesive formulation—see procedure for Example 1.
The substrate was EPDM. Cure was 3'@475° F.
Hot Melt performance: 32 pli with 95% R,5Coh.
Heat/molding resistance: Example 4 was rated 4.0 @ 350° F., not tested further.

Example 5

| Component | |
|---|---|
| 39.3 | Airthane PHP-75D |
| 39.3 | Airthane PPT-65D * |
| 10 | EPON 862 |
| 10 | dinitrosobenzene |
| 0.5 | tin catalyst |
| 0.9 | moisture scavenger |
| 100 | total wt. parts |

* PPO-TDI prepolymer with 7.5% NCO, <0.1% free TDI (Air Products and Chemicals)

Final adhesive was ~75% solids in a solvent blend—mostly n-butyl acetate and a lesser fraction of chlorotoluene. A total of ~2.1 #/gal OC was contained.
Viscosity was ~225 cps (Brookfield LV-II, 30 rpm, #2, ~23° C.)
Substrate was EPDM. Cure was 3'@425° F.
Hot Melt performance was 48 pli with 98% R, 2% Coh

Example 6

| | |
|---|---|
| 100 | PBD-TDI Prepolymer* |
| 0.5 | tin catalyst |
| 100 | total wt. parts |

*a single Polybutadiene prepolymer prepared in accordance w/U.S. Pat. No. 6,262,217 using R20LM polyol capped with TDI) % NCO was ~9 and containing less than 1000 ppm free TDI monomer.

Adhesive was prepared by charging above ingredients+xylene to container+rolling in to mix. % solids and viscosity are estimated at 75% solids and 800 cps.
Hot Melt performance: 34 pli 40% R.35% HMF.25% RC.

The invention has been described with reference to the preferred embodiment. Modifications and alterations will occur to others upon a reading and understanding of the specification. It is intended by Applicants to include all such modifications and alterations insofar as they come within the scope of the appended claims or the equivalents thereof.

What is claimed is:

1. A flock adhesive, comprising:
   an organic solvent which is a non-HAP, non-photochemically reactive solvent, and said non-HAP solvent is present in an amount from about 2.5% to about 50% by weight;
   one or more of an isocyanate-terminated polyol prepolymer, said polyol prepolymers containing less than 1000 ppm of residual isocyanate monomer;
   an aromatic nitroso compound;
   optionally, an epoxy resin, and
   optionally, a catalyst,
   said adhesive having a solids content of at least 50% and a viscosity less than or equal to 1,000 cenhipoise.

2. A flock adhesive according to claim 1, wherein said isocyanate-terminated polyol prepolymer is selected from the group consisting of an isocyanate-terminated alkylene ether polyol prepolymer, isocyanate-terminated polyester polyol prepolyrner, and isocyanate-terminated polyalkadiene polyol prepolymer.

3. A flock adhesive according to claim 2, wherein the equivalent weight of said polyol prepolymer is from about 200 to about 1000.

4. A flock adhesive according to claim 2, wherein said polyether or polyalkadiene polyol of said prepolymer has an OH functionality of from 2–6.

5. A flock adhesive composition according to claim 4, wherein said isocyanate-terminated polyol prepolymer comprises hydroxy-terminated polyols reacted with excess (>4:1 equivalents) polyisocyanates selected form the group consisting of aliphatic, cycloaliphatic, aromatic and alkyl-substituted diisocyanates.

6. A flock adhesive composition according to claim 5, wherein said adhesive has a solids content of from about 50% to about 97.5% by weight.

7. A flock adhesive composition according to claim 5, wherein said isocyanate-terminated polyol prepolymer is a reaction product of toluene diisocyanate and a polyather-polyol having a OH functionality of from 2–6.

8. A flock adhesive according to claim 7, wherein said polyetherpolyol has an OH functionality of from 3–5.

9. A flock adhesive composition according to claim 1, wherein said aromatic nitroso compound is dinitrosobenzene, and said dinitrosobenzene is present in an amount from about 0.5% to about 15% of the total dry weight of said composition.

10. A flock adhesive composition according to claim 1 wherein said non-HAP solvent is n-butyl acetate, and said solvent is present in an amount from about 15% to about 30% by weight of said composition total weight.

11. A flock adhesive composition according to claim 10, comprising n-butyl acetate, the reaction product of toluene diisocyanate and a polyetherpolyol having a OH functionality of from 2.2–6, dinitrosobenzene, an epoxy novolak resin and dibutyl tin diacetate.

12. A flock adhesive composition according to claim 1, including said epoxy resin.

13. A flock adhesive composition according to claim 12, wherein said epoxy resin is an epoxy novolak resin and said epoxy novolak resin is present in an amount from about 3% to about 6% dry weight basis.

14. A flock adhesive composition according to claim 13, further including a fluorescing agent in an amount from about 0.1% to about 1% dry weight basis.

15. A flock adhesive composition according to claim 1, wherein said adhesive has a solids content of from about 60% to about 80% by weight.

16. A flock adhesive composition according to claim 1, wherein said viscosity is from about 50 to about 1000 cps.

17. A method for applying flock fibers to an elastomenc substrate utilizing the flock adhesive composition of claim 1.

18. A method for applying flock to an elastomeric substrate, said method comprising the steps of:
   a. preparing a surface of said substrate;
   b. applying a liquid layer of an adhesive composition to said substrate;
   c. orienting and affixing said flock fibers to a surface of said rubber substrate through said adhesive layer to form a flocked substrate; and
   d. curing said flocked substrate;
   wherein said adhesive composition comprises: an organic solvent; at least one of an isocyanate-terminated polyether polyol prepolymer or an isocyanate-terminated polyalkadiene polyol prepolymer, said polyol prepolymer containing less than 1000 ppm of residual isocyanate monomer; an aromatic nitroso compound; an optional catalyst; and an optional epoxy resin; said adhesive composition having a solids content of at least 50%.

19. A method according to claim 18, wherein said elastomeric substrate comprises one or more of natural rubbers, polychioroprene rubber, nitrile rubber, chlorobutadiene, chlorinated isoprenes, butyl rubber, TPO, TPE, polyurethane rubber, and ethylene/propylene copolymers or terpolymers.

20. A method according to claim 18, wherein said surface of said elastomeric substrate is prepared as by application of a primer coating.

21. A method according to claim 18, wherein said flock adhesive comprises a prepolymer based on a polyether polyol having an OH functionality of from 2–6.

22. A method according to claim 21, wherein said aromatic nitroso compound is dinitrosobenzene and said dinitrosobenzene is present in an amount from about 0.5% to about 15% dry weight of said composition total weight.

23. A method according to claim 22, wherein said adhesive composition is applied to said substrate at a temperature of from about 30° C. to about 100° C. and has a solids content of from about 90% to about 97.5% of said composition total weight.

24. A method according to claim 21, wherein said flock adhesive comprises isocyanate-terminated polyol prepolymers comprising hydroxy-terminated polyols reacted with greater than 4:1 equivalent charge ratio of isocyanate selected from aliphatic, cycloaliphatic, aromatic and alkyl-substituted diisocyanates.

25. A method according to claim 24, wherein said isocyanate terminated polyetherpolyol comprises a polyether poiyol having a OH functionality of from 3–5.

26. A method according to claim 24, wherein said isocyanate-terminated polyol prepolymer comprises a hydroxy-terminated polyather polyol reacted with toluene diisocyanate.

27. A method according to claim 26, wherein said adhesive has a solids content of about 75% of said composition total weight.

28. A method according to claim 18, wherein the equivalent weight of said polyol prepolymer is from about 200 to about 1000.

29. A method according to claim 18, including said epoxy resin.

30. A method according to claim 29, wherein said epoxy resin is an epoxy novolak resin and said epoxy novolak resin is present in an amount from about 3 to about 6% dry weight basis of said composition total weight.

31. A method according to claim 18, wherein said viscosity is from about 50 to about 1000 cps.

32. A flock adhesive composition containing a solids content of from about 50% to about 97.5% by weight and a viscosity of less than or eaual to 1000 centipoise, comprising:
an organic solvent which is a non-HAP and is non-photochemically reactive and is selected from the group consisting of methyl acetate, n-butyl acetate, t-butyl acetate, acetone, ethyl acetate, isopropyl acetate, isobutyl acetate, n-butyl propionate, tetrahydrofuran, n-methyl pyrrolidone, heptane, dimethylformamide, diisobutyl ketone, methyl isoamyl ketone, monochlorotoluene, and vm&p naphtha;
one or more of an isocyanate-terminated polyol prepolymer, said polyol incorporated in said prepolymer having an OH functionality of from 2 to 6, and containing less than 1000 ppm of residual isocyanate monomer,
an aromatic nitroso compound;
optionally, an epoxy resin; and
optionally a catalyst.

33. The flock adhesive of claim 32, wherein said adhesive has a viscosity of less than 500 centipoise.

34. The flock adhesive of claim 33, wherein said adhesive has a viscosity of from about 100 to about 300 centipoise.

35. The flock adhesive of claim 32, wherein said aromatic nitroso compound is dinitrosobenzene, and said dinitrosobenzene is present in an amount from about 0.5% to about 15% of the total dry weight of said composition.

36. The flock adhesive of claim 35, wherein said dinitrosobenzene is present in an amount from about 2% to about 8% of the total dry weight of said composition.

37. The flock adhesive composition of claim 32, including said epoxy resin, and said epoxy resin is present in an amount from about 1% to about 20% of the total dry weight of said composition.

38. The flock adhesive composition of claim 37, wherein said epoxy resin is an epoxy novolak resin, and said epoxy novolak resin is present in an amount from about 1% to about 20% of the total dry weight of said composition.

39. The flock adhesive of claim 38, wherein said epoxy novolak resin is a hydroxyl free epoxy novolak resin and said resin is present in an amount from about 1% to about 20%.

40. The flock adhesive composition of claim 39, wherein said hydroxyl free epoxy novolak resin is present in an amount from about 3% to about 7% of the total dry weight of said composition.

41. The flock adhesive composition of claim 32, including said epoxy resin and said epoxy resin is present in an amount of from about 1% to about 15% by weight of the total dry weight of said composition.

42. The flock adhesive composition of claim 41, wherein said solids content is from about 60% to about 80%.

43. The flock adhesive of claim 32, wherein said aromatic nitroso compound is present in an amount from about 0.5% to about 15% by weight of said total dry weight of said composition, and including said epoxy resin, wherein said epoxy resin is an epoxy novolak hydroxyl free resin which is present in an amount from about 3% to about 7% of the total dry weight of said composition, and wherein said adhesive has a viscosity less than 500 centipoise.

44. The flock adhesive composition of claim 43, wherein said solids content is from about 60% to about 80%.

45. The flock adhesive composition of claim 32 having a solids content of from about 60% to about 80%.

46. The flock adhesive composition of claim 32, wherein said non-HAP, non-photochemically reactive solvent is n-butyl acetate.

47. The flock adhesive composition of claim 32, wherein said solids content is from about 60% to about 80% and said non-HAP, non-photochemically reactive solvent is one or more of methyl acetate, n-butyl acetate, n-butyl propionate, t-butyl acetate, acetone, ethyl acetate, isopropyl acetate, isobutyl acetate, tetrahydrofuran, n-methyl pyrrolidone, aliphatic hydrocarbons such as heptane, dimethylformamide, diisobutyl ketone, methyl isoamyl ketone, monochlorotoluene, and vm&p naphtha.

48. The flock adhesive composition of claim 32, wherein said solids content is from about 60% to about 80% and wherein said non-HAP, non-photochemically reactive solvent is n-butyl acetate.

49. A two-part (A-B) flock adhesive composition comprising:
in either or both parts A and B, an organic solvent which is a non-HAP solvent and is present in an amount from about 2.5% to about 50% by weight of said total composition weight,
in part A, an isocyanate-terminated polyol prepolymer selected from the group consisting of an isocyanate terminated alkylene ether polyol prepolymer, an isocyanate terminated polyester polyol and an isocyanate-terminated polyalkadiene polyol prepolymer, said isocyanate-terminated polyol prepolymer containing less than 1,000 ppm of residual isocyanate monomer, and in part B, a polyol,
an aromatic nitroso compound in either part A or B; and
optionally, in part A or B an epoxy resin;
said adhesive having a total solids content of at least 50% and containing less than 1% of a HAP solvent.

50. An adhesive composition according to claim 49, wherein said isocyanate-terminated polyol prepolymer is a reaction product of toluene diisocyanate and a polyether polyol having an OH functionality of from 2–6.

51. An adhesive composition according to claim 50, wherein said adhesive has a solids content of from about 60% to about 80% and a viscosity of from about 50 to about 1000 cps.

52. An adhesive composition according to claim 49, wherein said aromatic nitroso compound is present in an amount from about 0.5% to about 15% of the total dry weight of said composition.

53. An adhesive composition according to claim 49, including said epoxy resin and said catalyst.

54. An adhesive composition according to claim 53, wherein said epoxy resin is an epoxy novolak resin and said epoxy novolak resin is present in an amount from about 3 to about 6% of the total dry weight of said composition.

55. An adhesive composition according to claim 53, wherein said catalyst is one or more of tin dioctoate, tin diethyihexanoate, dibutyl tin dilaurate, and dibutyl tin diacetate in an amount from about 0.1% to about 1.0% of the total dry weight of said composition.

56. A flock adhesive composition, comprising:
an organic solvent which is a non-HAP and is non-photochemically reactive and is selected from the group consisting of methyl acetate, n-butyl acetate, t-butyl acetate, acetone, ethyl acetate, isopropyl acetate, isobutyl acetate, n-butyl propionate, tetrahydrofuran, n-methyl pyrrolidone, heptane, dimethylforrnaflhide, diisobutyl ketone, methyl isoamyl ketone, monochlorotoluene, and vm&p naphtha;

one or more of an isocyanate-terminated polyol prepolymer, said polyol incorporated in said prepolymer having an OH functionality of from 2 to 6, and containing less than 1000 ppm of residual isocyanate monomer;

an aromatic nitroso compound;

an epoxy resin; and optionally a catalyst.

57. A flock adhesive, comprising:

an organic solvent which is a non-HAP, non-photochemically reactive solvent, and said non-HAP solvent is present in an amount from about 2.5% to about 50% by weight;

one or more of an isocyanate-terminated polyol prepolymer, said polyol prepolymers containing less than 1000 ppm of residual isocyanate monomer;

an aromatic nitroso compound;

optionally, an epoxy resin, and a catalyst selected from the group consisting of tin dioctoate, tin diethylhexanoate, dibutyl tin dilaurate, and dibutyl tin diacetate in an amount from about 0.1% to about 1.0% of the total dry weight of said composition;

said adhesive having a solids content of at least 50% and a viscosity less than or equal to 1,000 centipoise.

* * * * *